E. C. GARDNER.
ANTISKIDDING DEVICE FOR WHEELS.
APPLICATION FILED APR. 1, 1908.
914,712.
Patented Mar. 9, 1909.
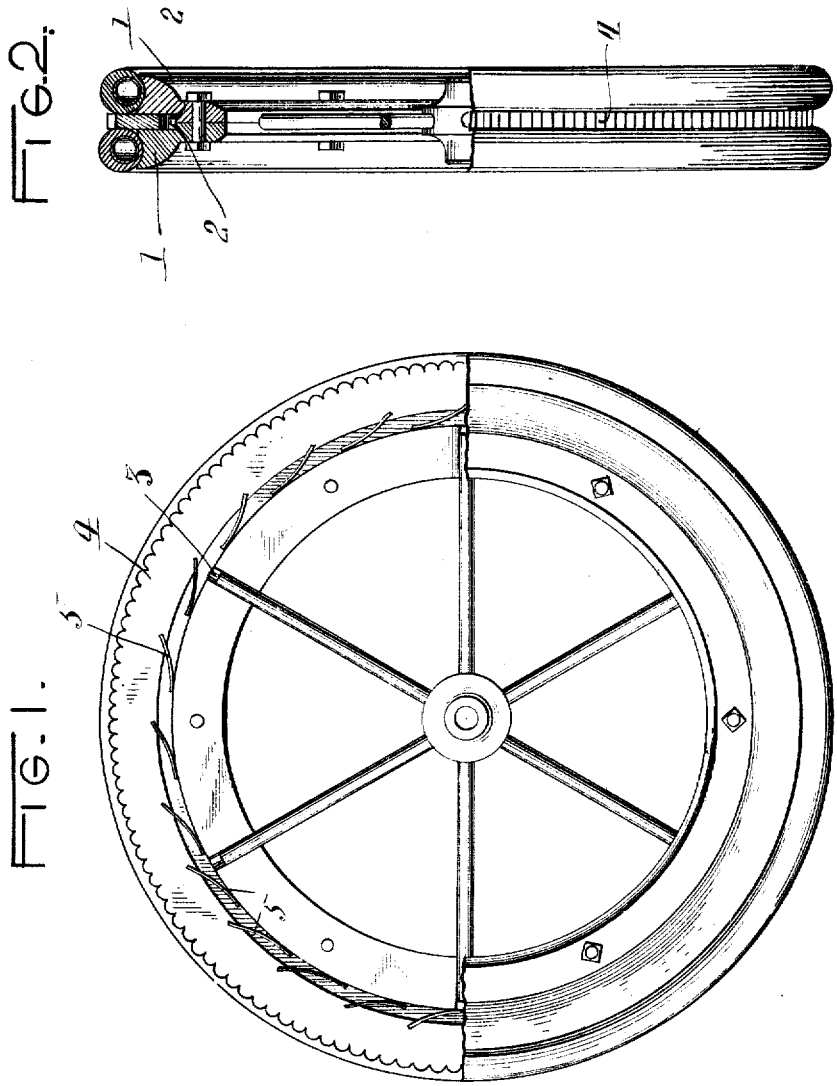

UNITED STATES PATENT OFFICE.

EDWARD C. GARDNER, OF MONTREAL, QUEBEC, CANADA.

ANTISKIDDING DEVICE FOR WHEELS.

No. 914,712.        Specification of Letters Patent.        Patented March 9, 1909.

Application filed April 1, 1908. Serial No. 424,512.

*To all whom it may concern:*

Be it known that I, EDWARD C. GARDNER, a subject of the King of Great Britain, residing in the city and district of Montreal, in the Province of Quebec, Canada, have invented certain new and useful Improvements in Antiskidding Devices for Wheels; and I do hereby declare that the following is a full, clear, and exact description of the invention, such as will enable others skilled in the art to which it appertains to make and use the same.

The invention to be hereinafter described relates to vehicle wheels, and more particularly to non-skidding devices for automobile wheels and the like.

Broadly speaking, the invention comprises fellies or tire seats adapted to be clamped together, and a non-skidding member movably mounted between the same and adapted to engage the surface of the roadbed over which the vehicle travels.

In order to more clearly disclose the construction, operation and use of the invention, reference should be had to the accompanying drawings forming part of the present application.

Throughout the several views of the drawings, like reference characters designate the same parts.

In the drawings: Figure 1 is a side elevation, partly broken away; and, Fig. 2 is an edge view, partly in section.

Two complementary fellies or tire seats 1 are provided, each being recessed as at 2 on its inner face, and provided with radial grooves 3 for the reception of spokes. When clamped together by bolts or other suitable fastenings, the recesses 2 of the fellies form an annular channel, in which is seated the spring-pressed yielding annular disk or plate 4. The width of the channel and the thickness of the disk 4 should be so proportioned as to allow the sides of the fellies 1 to exert a slight frictional grip on the disk when the fellies are clamped tightly together. The springs 5, while supporting the disk, also allow a slight radial movement of the same as the wheel travels. Thus, when the pneumatic tires are slightly compressed by the load pressure, the rim of the disk will be brought into contact with the roadbed, and a secure hold will be given, absolutely preventing skidding or slipping of the tire in any direction, either forward, backward or sidewise. As shown in the drawings, the gripping edge of the disk is simply corrugated. It is evident, however, that this edge may be formed either with conical, pyramidal or any other form of gripping surface or teeth desired to prevent skidding or slipping of the wheel.

Many changes may be made in the construction and arrangement of the several parts, and many other combinations of these parts and substitutions for them may be had, without in any way departing from the field and scope of the present invention, and it is meant to include all such within this application, wherein only one preferred form of the invention has been shown and described.

Having thus fully described my invention, what I claim as new, and desire to secure by Letters Patent, is:—

A vehicle wheel comprising two annular tire seats, each provided with an annular recess and radial grooves and adapted to be clamped together to form an annular channel therebetween, an annular disk movably mounted in said channel, and springs for supporting said annular disk.

In witness whereof I have hereunto set my hand in the presence of two witnesses.

EDWARD C. GARDNER.

Witnesses:
    EUGENE M. SLIREY,
    W. S. BABCOCK.